United States Patent [19]
Bieck

[11] Patent Number: 5,777,820
[45] Date of Patent: Jul. 7, 1998

[54] CASSETTE HOLDER

[75] Inventor: Torsten Bieck, Waldachtal, Germany

[73] Assignee: fischerwerke, Artur Fischer GmbH & Co. KG, Waldachtal, Germany

[21] Appl. No.: 800,479

[22] Filed: Feb. 14, 1997

[30] Foreign Application Priority Data

Mar. 14, 1996 [DE] Germany .................. 196 09 998.6

[51] Int. Cl.⁶ .................. G11B 17/00; G11B 5/027
[52] U.S. Cl. .................. 360/96.5; 360/85
[58] Field of Search .................. 360/96.5, 85, 99.02, 360/99.06; 369/77.2, 77.1, 75.2, 75.1

[56] References Cited

U.S. PATENT DOCUMENTS 5,629,817  5/1997  Shiomi .................. 360/96.5

FOREIGN PATENT DOCUMENTS

| 2462769C2 | 1/1982 | Germany . |
| 4219232A1 | 12/1993 | Germany . |
| 4324265A1 | 1/1995 | Germany . |
| 9317730 | 3/1995 | Germany . |

Primary Examiner—Allen Cao
Attorney, Agent, or Firm—Michael J. Striker

[57] ABSTRACT

The cassette holder for the transverse storage of magnetic tape cassettes, compact cassettes and digital cassettes has locking members (10) provided for locking the tape reel hubs (17) of a compact cassette (19) on a slider element (2) on which the cassette is moved from a removal position to a storage position. The movement of the locking members (10) is triggered by an actuating device (3) having a control edge (4) which raises and locks the locking members via a first turning pin (9) arranged with the locking members (10) on a common shaft (11). The actuating device (3) is actuated by the standard thickened portion (18) on the compact cassette and the control edge (4) in question. The first turning pin (9) travels in a first recess (6) in the base plate (1) and the locking members (10) travel in additional recesses (20) in the base plate (1) to reduce the cassette holder height. Compared with known cassette holder structures, the overall height of the cassette holder and the number of its components are reduced, thus simplifying the cassette structure.

7 Claims, 5 Drawing Sheets

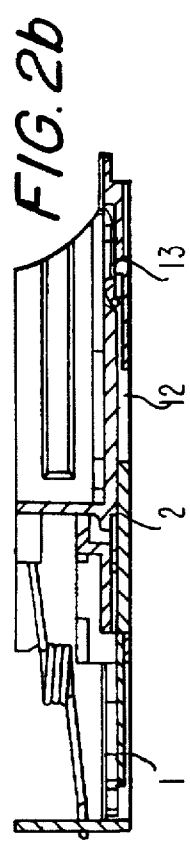
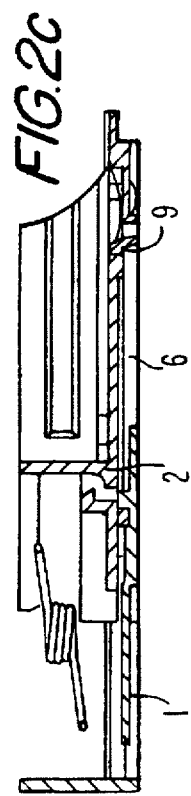
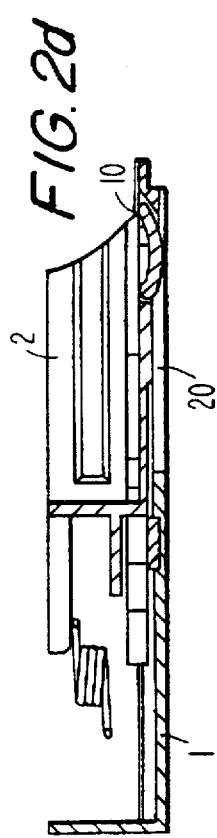
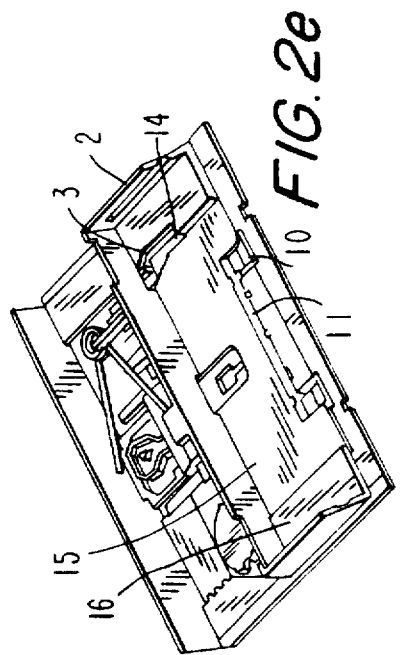
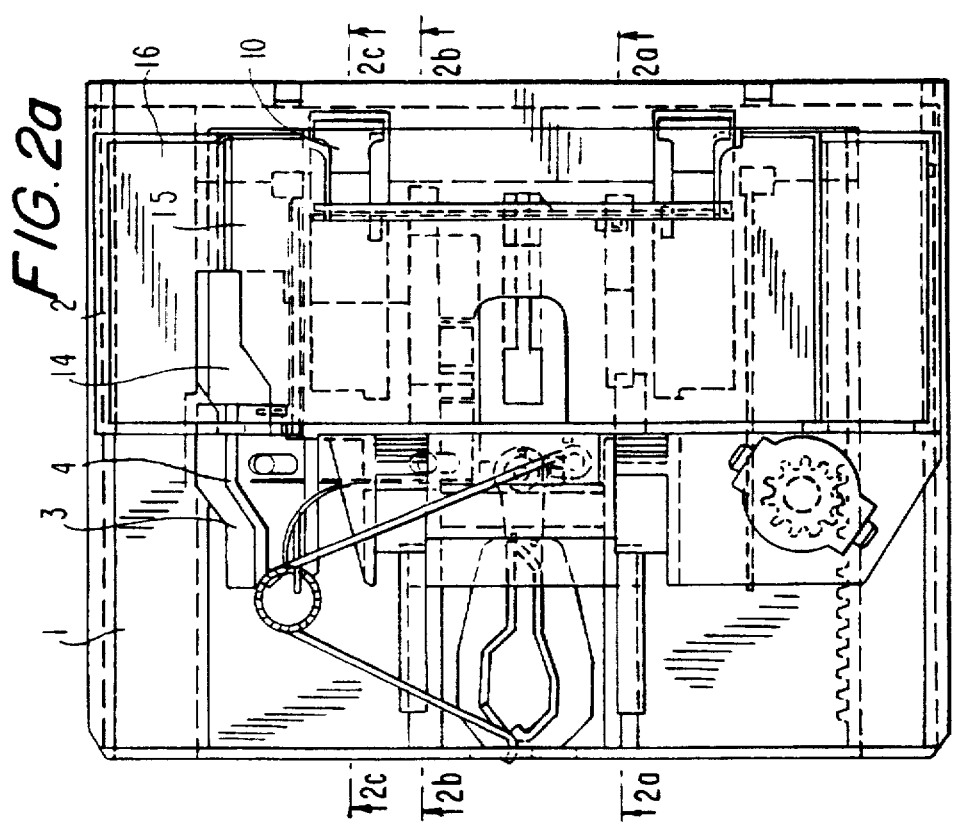

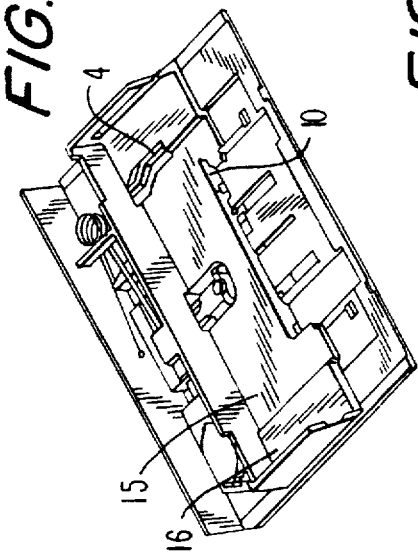
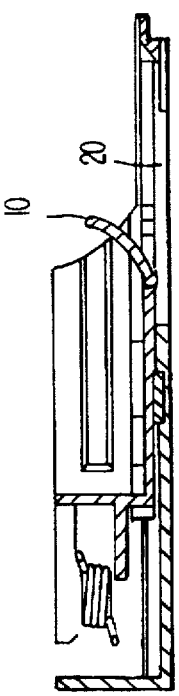
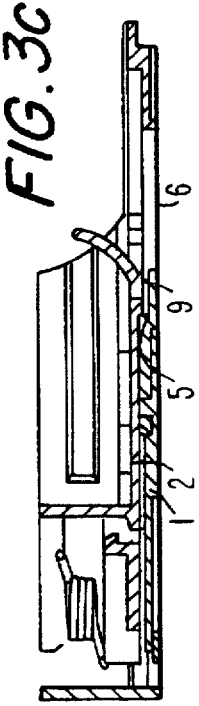
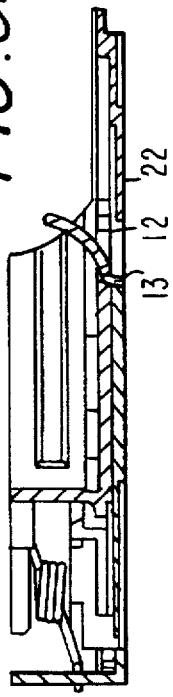
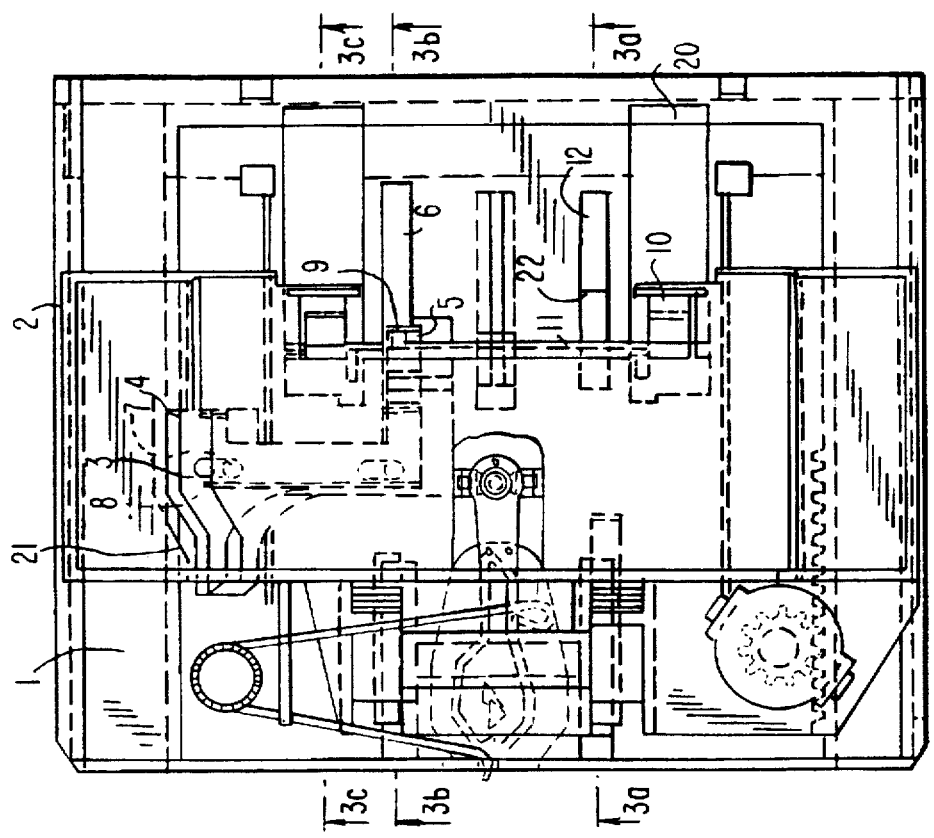

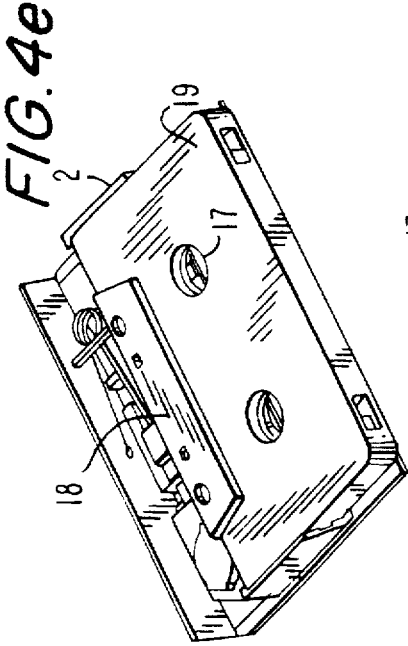
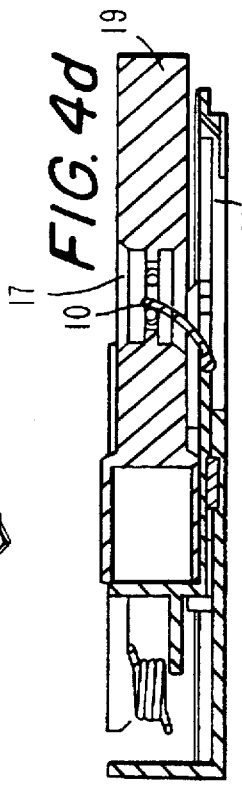
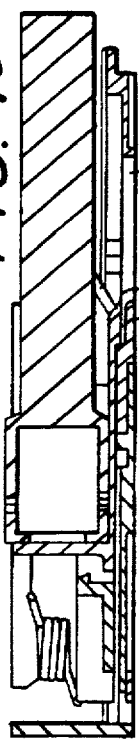
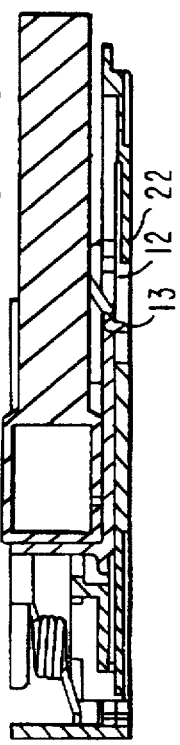
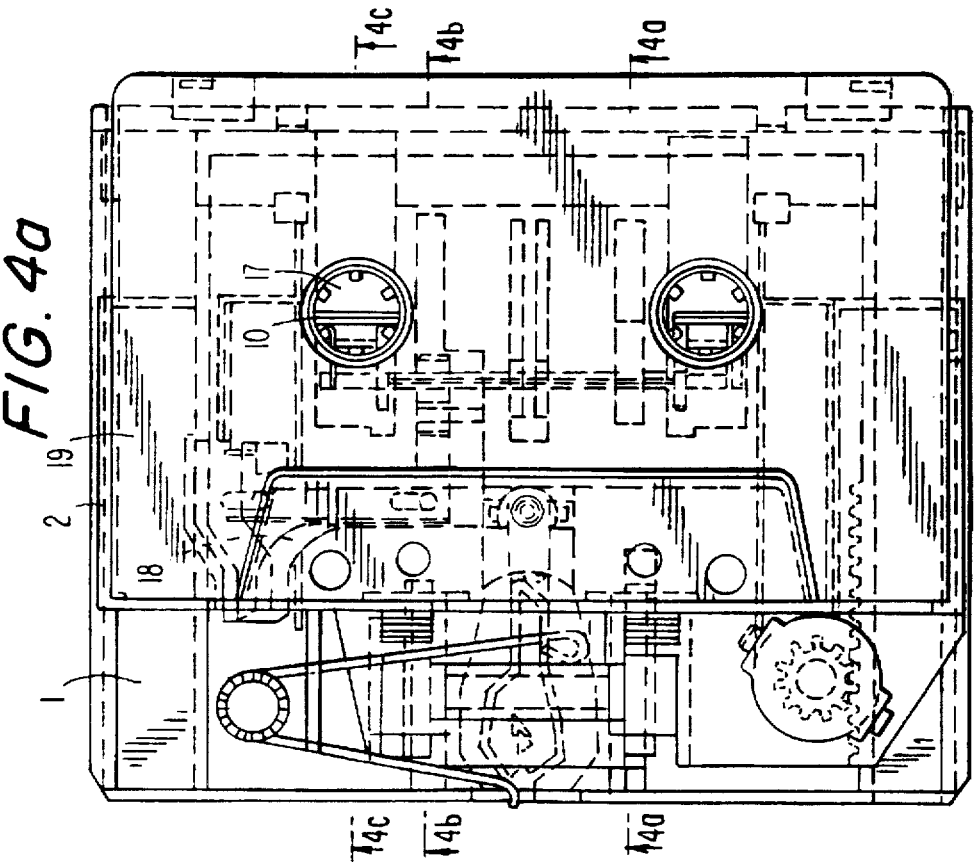

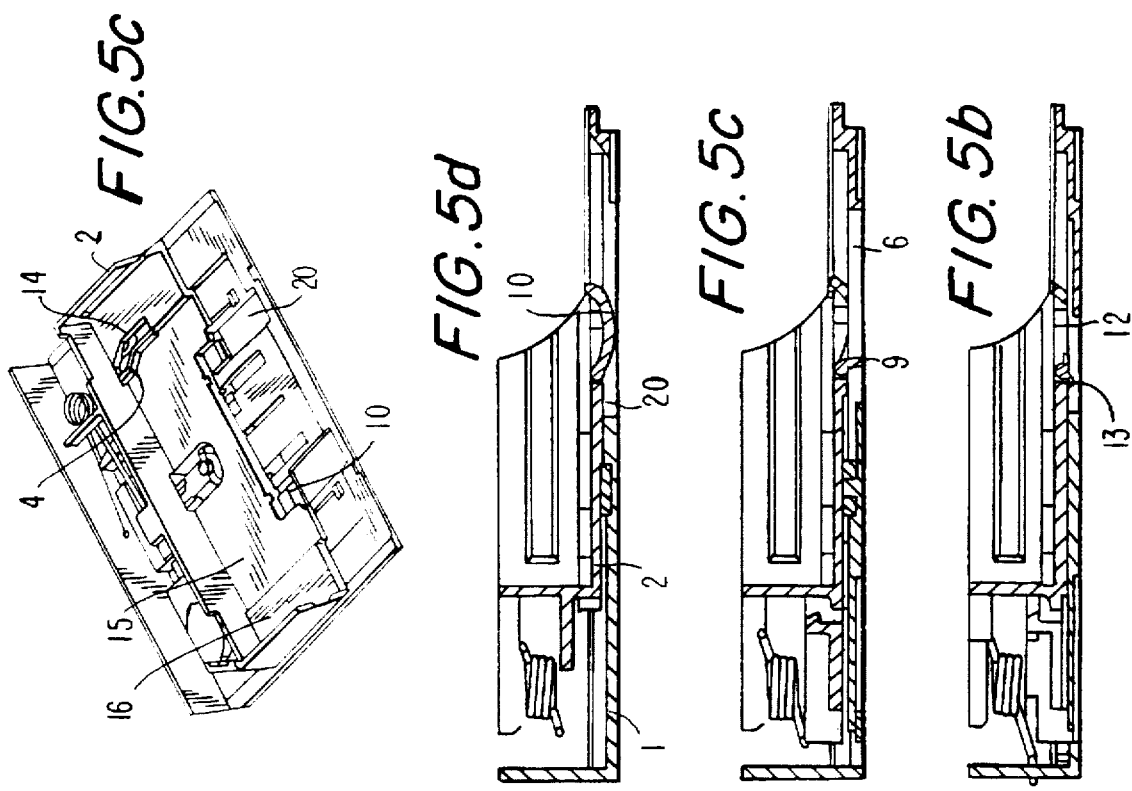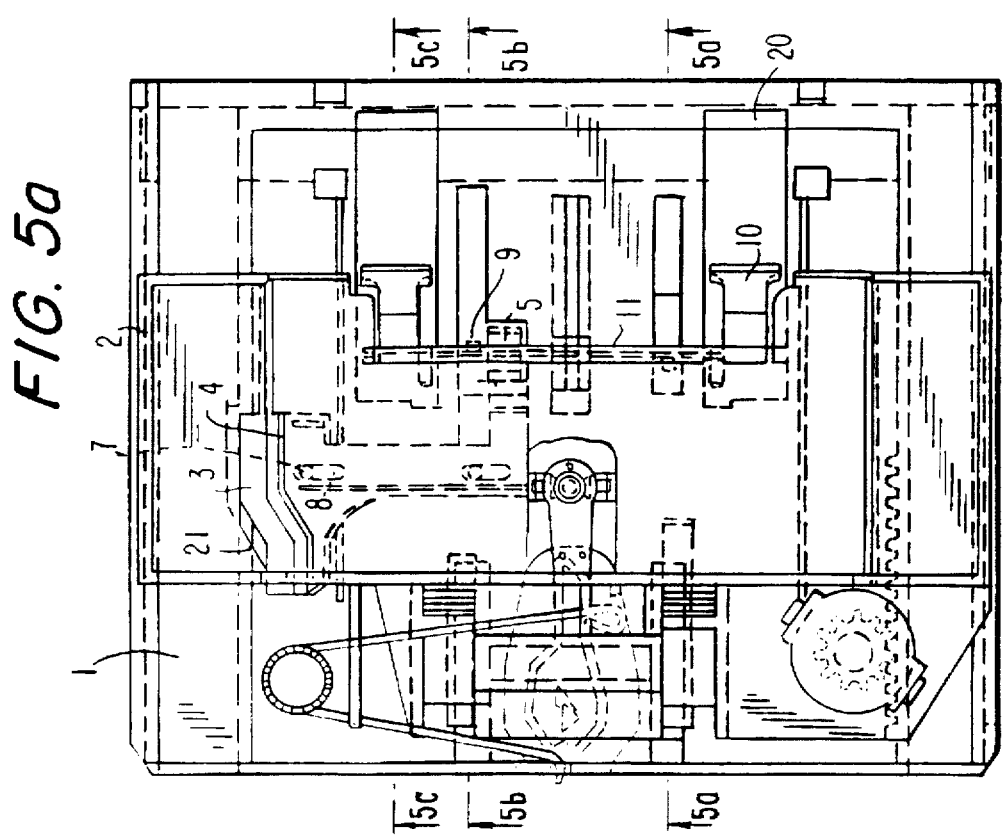

CASSETTE HOLDER

BACKGROUND OF THE INVENTION

The present invention relates to a cassette holder for transverse storage of magnetic tape cassettes or similar sound carriers, and, more particularly, to a cassette holder comprising a base plate, a slider element mounted on the base plate and extendable from a storage position to a removal position, locking members engageable in two tape reel hubs of a compact cassette placed on the slider element in the storage position and a movable actuating device including control elements arranged on a lower-lying portion of the slider element and slidably mounted on the base plate to be movable on the base plate transversely to the slider element movement direction by a raised portion on the compact cassette when the slider element with the cassette is moved into the storage position.

German Published Patent Application DE 42 19 232 A1 describes this type of cassette holder. That known cassette holder comprises a housing with a slider element that can be pushed into the housing against a spring force and can be locked in the inserted position. The slider element receives the cassette that is to be transversely stored. This cassette can be easily removed or exchanged in the removal position of the slider element. In the removal position, the slider element protrudes obviously from the housing. In the storage position, the slider element can be locked and unlocked in the housing.

Such cassette holders are used for the storage of commercially available compact cassettes (MCC), the tape reel hubs of which are freely accessible, and also of digital cassettes (DCC) that have completely closed broad faces. So that, in compact cassettes, the reel hubs and also the woundup tape material do not make any uncontrolled movements when subjected to vibrations, the known cassette holder has locking members for the reel hubs, which locking members engage the reel hubs when a compact cassette is inserted and secure them against rotation. Since this is not possible and is also unnecessary in the case of the closed broad faces of digital cassettes, the known cassette holder is constructed in such a manner that the locking member is actuated only when the compact cassettes are inserted. This is controlled by the thickened portion of the housing, in standard compact cassettes, in the region where the playback and recording heads of a tape recorder come into contact with the magnetic tape. In the known cassette holder, the locking members that are rotatable into the locking position against a spring force are actuated by means of actuating instruments on insertion of a compact cassette. For that purpose, actuating elements are located in a lower-lying portion in which the compact cassette engages by one of the two raised or thickened portions formed on its broad faces. When a digital cassette, which has no such raised or thickened portion, is inserted, the actuating elements are not actuated with the result that the locking members are not rotated out of the supporting plane. Each tape reel hub is provided with a locking member, which is rotatable into the locking position against the force of an associated spring element.

A cassette holder for magnetic tape cassettes that are arranged to be inserted in the longitudinal direction is known from German Published Patent Application DE 43 24 265 A1. This cassette holder has locking members that likewise engage the tape reel hubs of the magnetic tape cassettes and are aligned in the direction of insertion, and a base plate, on which there is mounted a slider element that is lockable and extendable by a spring, moving the magnetic tape cassettes from a storage position to a removal position. Mounted in the base plate is a sliding element which is displaceable by the magnetic tape cassette transversely to the direction of insertion and which has lateral control wedges and rotation elements with which the locking members are rotatable into the centers of the spools. The locking members are arranged on a transversely displaceable sliding element, which makes it possible for the locking members to be aligned exactly with the position of the associated spool center. The alignment is, in that case, effected by the thickened portion of the housing which is formed on each side of standard magnetic tape cassettes, which thickened portion, depending on the orientation of the magnetic tape cassette, presses against left-side or right-side control wedges of the sliding element and displaces that sliding element together with the locking devices arranged thereon into the required position. Control edges on the longitudinally displaceable slider element cause the locking members to be rotated into the locking position when the slider element has been inserted. Shafts having turning pins protruding radially at each end are provided as an actuating element for the locking members. The turning pins thus alter their lateral position in accordance with the position of the transversely displaceable sliding element. If the sliding element is in a middle position, the turning pins of the locking members are without effect.

Because of the lack of available space in motor vehicles, cassette holders must, while taking account of a minimum material thickness, have as small an overall height as possible.

SUMMARY OF THE INVENTION

It is an object of the present invention to provide a cassette holder for the transverse storage of magnetic tape cassettes or similar sound carriers, which has a reduced number of different components and thus a smaller overall height in comparison to the known cassette holders.

According to the invention, the cassette holder for transverse storage of magnetic tape cassettes, digital cassettes and compact cassettes, the compact cassettes each having two tape reel hubs and a thickened portion, comprises a base plate; a slider element mounted on the base plate movable from a storage position to a removal position in a slider element movement direction; a shaft mounted on the slider element, extending transverse to the slider element movement direction and having at least one first turning pin protruding therefrom; a plurality of locking members extending from the shaft and engageable in two tape reel hubs of a compact cassette when the slider element with the compact cassette on it is in the storage position; and a movable actuating device comprising control elements arranged on a lower-lying portion of the slider element, said actuating device being slidably mounted on the base plate for motion transverse to the slider element movement direction by engagement with the thickened portion of the compact cassette when the slider element with the compact cassette thereon is moved into the storage position. The control elements of the actuating device include control edges and a control wedge. The control edges on the actuating device are arranged on a lower-lying portion of the slider element and project through an opening provided in the slider element. During insertion of the slider element with the compact cassette thereon in the slider element movement direction, these control edges come into contact with the slider element which causes transverse movement of the actuating device and the control wedge, during this transverse movement of the actuating device, comes into contact with the at least one first turning pin protruding from the shaft, which rotates and locks the locking members on the shaft in the tape reel hubs of the compact cassette.

The locking members that can be rotated into a locking position are each advantageously arranged in a recess in the slider element and are provided on a common shaft that is mounted on the slider element in the cassette holder according to the invention.

As the slider element moves out of the removal position into the storage position, an actuating device arranged on the base plate is moved transversely to the direction of movement of the slider element by a control edge or element that projects through an opening in the slider element base surface, with the result that, once the slider element has reached the storage position, the locking members engage the tape reel hubs by engagement of a first turning pin protruding from the shaft with the actuating device. The control edge of the actuating device is arranged in an opening in the sound carrier supporting surface of the slider element. As a result, the control edge is actuated only on insertion of a compact cassette while the locking members are not actuated when a digital cassette is inserted. The locking members are locked in the storage position by engagement of the first turning pin with the control wedge of the actuating device.

In order to reduce the overall height further, the actuating device advantageously has a control wedge that is arranged, in the same way as the turning pin, in a common first recess in the base plate and moves therein. As the first turning pin moves to the storage position, the turning pin strikes the control wedge which has moved into the path of the turning pin in the same recess, and is rotated by that control wedge.

According to one embodiment of the invention, the opening in the slider element has a control edge which, during movement of the slider element from the storage position to the removal position, returns the actuating device to its starting position and, as a result, unlocks the locking members. The return of the actuating device is thus provided by simple structural features without the use of additional components. In order to ensure that the locking members, once unlocked, can also return to their original position, the shaft preferably has at least one second turning pin that protrudes from the shaft. The at least one second turning pin, according to one advantageous embodiment, protrudes into a second recess arranged in the base plate in the storage position.

According to another embodiment, as the slider element moves from the storage position to the removal position, a single second turning pin is rotated to its original position by an intermediate edge in the second recess that separates a deeper region of the second recess from a shallower region and, as a result, the locking members are removed from the tape reel hubs. That embodiment also makes optimum use of the available overall height.

According to an additional embodiment, an additional feature for reducing the overall height comprises additional recesses in which the respective control members move as the slider element moves.

In the whole cassette holder, constructed according to the invention, the use of as few as possible individual components for movement of the locking members, making use of all design options, means that the overall height is kept as small as possible. A decisive factor is also the minimal wall thickness of the plastics material required to ensure the desired stability and solidity.

BRIEF DESCRIPTION OF THE DRAWING

The invention is explained hereinafter in greater detail with reference to an embodiment illustrated in the drawings, in which:

FIG. 2a is a plan view of the cassette holder of FIG. 1 with the slider element and requisite individual parts in the removal position but without a cassette;

FIGS. 2b, 2c and 2d are vertical cross-sectional views through the cassette holder of FIG. 2a taken along section lines A—A, B—B and C—C respectively in FIG. 2a;

FIG. 2e is a top perspective view of the cassette holder of FIG. 2a;

FIG. 3a is a plan view of the cassette holder of FIG. 1 with the slider element and requisite individual parts in the storage position but without a compact cassette;

FIGS. 3b, 3c and 3d are vertical cross-sectional views through the cassette holder of FIG. 3a taken along section lines A—A, B—B and C—C respectively in FIG. 3a;

FIG. 3e is a top perspective view of the cassette holder of FIG. 3a;

FIG. 4a is a plan view of the cassette holder of FIG. 1 with the slider element and requisite individual parts in the storage position with a magnetic tape cassette;

FIGS. 4b, 4c and 4d are vertical cross-sectional views through the cassette holder of FIG. 4a taken along section lines A—A, B—B and C—C respectively in FIG. 4a;

FIG. 4e is a top perspective view of the cassette holder of FIG. 4a;

FIG. 5a is a plan view of the cassette holder of FIG. 1 with the slider element and requisite individual parts in the storage position, but without a digital cassette present;

FIGS. 5b, 5c and 5d are vertical cross-sectional views through the cassette holder of FIG. 5a taken along section lines A—A, B—B and C—C respectively in FIG. 5a; and FIG. 5e is a top perspective view of the casette holder of FIG. 5a.

DETAILED DESCRIPTION OF THE PREFERRED EMBODIMENT

Figure 1:
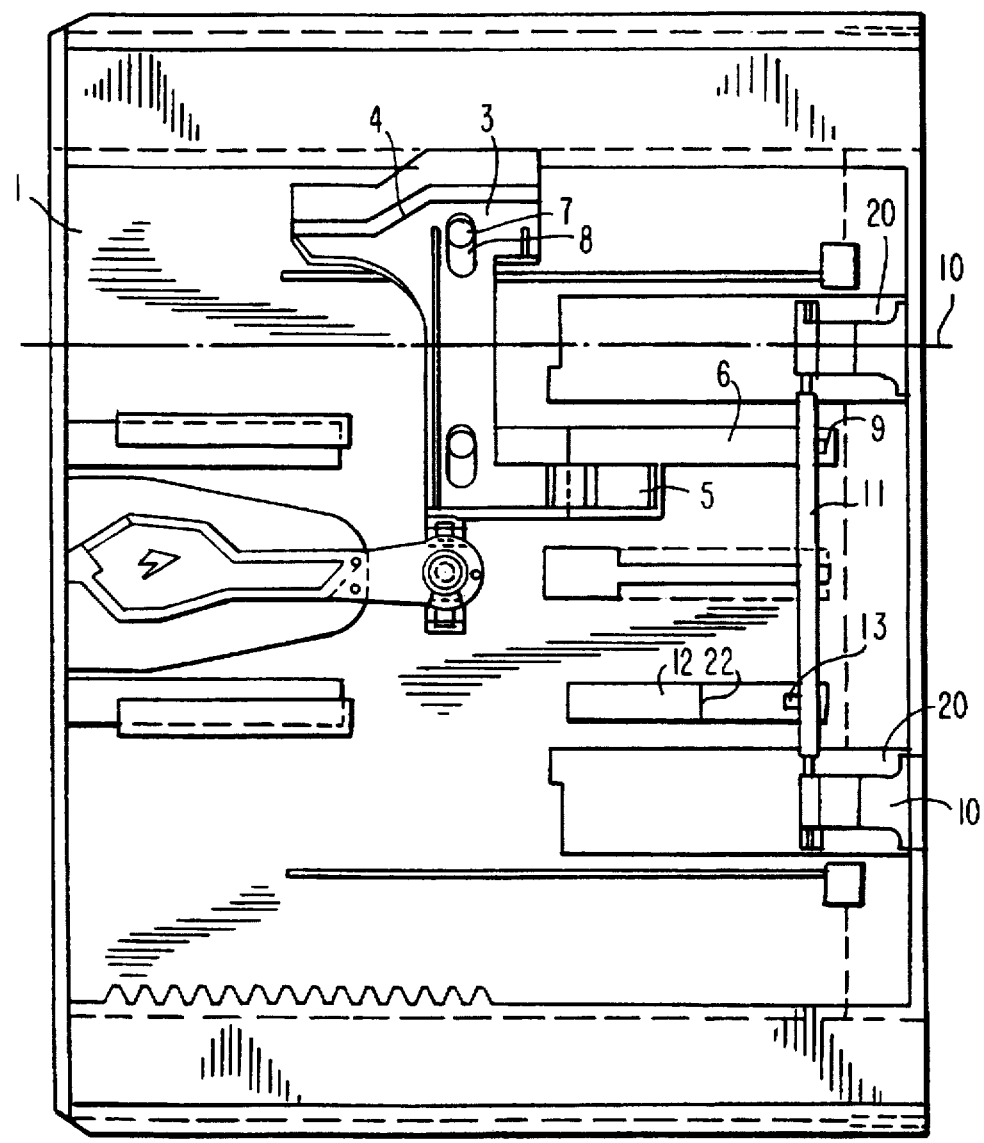
FIG. 1 is a plan view of the base plate of the cassette holder in the removal position shown without a cassette, slider element and requisite individual parts for moving the slider element.

The plan view, shown in FIG. 1, of the base plate 1 of a cassette holder does not include the individual parts that are shown in subsequent FIGS. 2a to 5e. These individual parts move the slider element 2 (FIGS. 2a to 5e) from a storage position to a removal position and lock the slider elements in the storage position. The locking devices shown in the drawing are not explained hereinafter in greater detail since these are generally known and are not the subject of the present invention.

FIG. 1 shows an actuating device 3 that is displaceable on the base plate 1 in the transverse direction (i.e. transversely to the slider element movement direction) and that has a control edge 4 that projects upwards perpendicularly and a control wedge 5 which, during displacement of the actuating device 3, travels in a first recess 6 provided in the base plate 1. The pins 7 in the longitudinal holes 8 are designed to allow, but limit, the transverse movement of the actuating device 3. The first recess 6 provided in the base plate 1 serves as a free space for a turning pin 9 that is arranged on the shaft 11 which projects beyond the locking members 10. During movement of the shaft 11, which is secured to the slider element 2, not shown, the first turning pin 9 can engage the control wedge 5, which is likewise arranged in the first recess 6, when the control wedge 5 is aligned with the turning pin 9. As a result, the locking members 10 are moved in the desired direction. A second recess 12 provided in the base plate 1 serves for the return of the locking members 10 by a second turning pin 13 traveling in the second recess 12.

Each of the views in FIGS. 2a, 3a, 4a and 5a is a plan view of the cassette holder, in which broken lines indicate also the parts that are not visible. Each of the views in FIGS. 2b, 2c and 2d shows a cross-sectional view taken along the respective section lines A—A, B—B and C—C in FIG. 2a. The same is true of FIGS. 3b to 3d, 4b to 4d and 5b to 5d. FIGS. 2e, 3e, 4e and 5e are each perspective views of the cassette holder.

FIGS. 2a to 2e shows the cassette holder with the slider element 2 in the removal position. The locking members 10 which are secured to the slider element 2 by the shaft 11 are in the lowered, that is the inoperative position, and the actuating device 3 is in the unlocked position. The opening 14 in the slider element 2 is not in the vicinity of the control edge 4 of the actuating device 3. As can be seen from FIG. 2e, a substantial portion of the opening 14 is on the lower-lying region 15 of the supporting surface for the cassette. The higher-lying regions 16 are provided on each side of it for standard cassettes so that digital cassettes, which have no thickened region of the housing, will rest only on the higher-lying regions 16 while magnetic tape or compact cassettes will rest on both the lower-lying region 15 and the higher-lying region 16 and, as the slider element 2 moves, can engage the control edge 4 of the actuating device 3 via the thickened portion of the housing.

That is shown in FIG. 3 although for clarity's sake the magnetic tape cassette is not shown. FIG. 4 also shows the slider element in the storage position but with a magnetic tape cassette 19. The engagement of the locking members 10 in the tape reel hubs 17 is shown in FIG. 4. Also shown is the thickened portion 18 of the housing on the magnetic tape cassette 19. As the slider element 2 is moved, the shaft 11 which is mounted rotatably on the slider element 2, together with the locking members 10 and the turning pin 9, moves also. The movement of the locking members occurs in the additional recesses 20 and the movement of the turning pin 9 occurs in the first recess 6 in the base plate 1. As a result of the thickened portion 18 of the housing in the lower-lying region 15, that thickened portion presses against the control edge 4 of the actuating device 3 and moves the actuating device 3 transversely to the direction of movement of the slider element 2. Compared with the illustration in FIG. 2, the pins 7 are at the other end of the longitudinal holes 8 in FIG. 4. As a result, the control wedge 5 also moves from its rest position in the first recess 6 into the path of the turning pin 9 with the result that the turning pin 9 is forced, by the continuing movement of the slider element 2, to avoid the control wedge 5 by a rotational movement. As a result, as shown in FIGS. 3b, 3c and 3d and FIGS. 4b, 4c and 4d, the locking members 10 are moved upwards out of the additional recesses 20 and engage the tape reel hubs 17. The shaft 11 and hence the locking members 10 are locked in that position by the control wedge 5.

When the slider element moves from the storage position according to FIGS. 3a to 3e and 4a to 4e to the removal position according to FIG. 2a to 2e, the control element 21 on the slider element 2 first ensures that, by acting on the control edge 4 on the actuating device 3, the actuating device 3 is returned to its starting position shown in FIG. 2a. The control element 21 is an edge of the opening 14 in the slider element. Thus the control wedge 5 moves from the region of influence of the turning pin 9 in the first recess 6 and unlocks the locking members 10. As the slider element 2 continues to move to the removal position, the second turning pin 13, which is in the deeper region of the second recess 12 when the locking members 10 are raised, is moved against an intermediate edge 22 of the second recess 12 that separates the deeper region from the shallower region, and is caused by that edge to rotate, which rotation returns the locking members 10 to their rest positions, shown in FIG. 2b to 2d. The deeper region of the recess 12 is an opening in the base plate, which saves on material and overall height.

FIGS. 5a to 5e show the slider element in the storage position for the case when a digital cassette is on the slider element. In that case, no contact takes place and therefore also no movement of the actuating device 3, with the result that the turning pin 9 which is moving in the first recess 6 is not caused to rotate. As a result, the locking members 10 remain in their rest position.

The disclosure of German Patent Application 196 09 998.6 of Mar. 14, 1996 is incorporated here by reference. This German Patent Application discloses the instant invention described herein and claimed in the claims appended below and is the basis for a claim of priority for the instant invention under 35 U.S.C. 119.

While the invention has been illustrated and described as embodied in a cassette holder for a magnetic tape cassette, a compact cassette, a digital cassette or similar sound carrier, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed is new and is set forth in the following appended claims:

I claim:

1. A cassette holder for transverse storage of a magnetic tape cassette, digital cassette or a compact cassette, each of said cassette having two tape reel hubs and a thickened portion, said cassette holder comprising a base plate (1);

a slider element (2) mounted on the base plate (1) so as to be extendable from a storage position to a removal position in a slider element movement direction;

a shaft (11) mounted on the slider element (2) and extending transverse to the slider element movement direction, said shaft (11) having at least one first turning pin (9) protruding therefrom;

a plurality of locking members (10) extending from the shaft (11) and engageable with the two tape reel hubs (17) when said slider element (1) with said cassette thereon is in the storage position; and a movable actuating device (3) comprising control elements arranged on a lower-lying portion (15) of the slider element (2) and slidably mounted on the base plate (1) so that said actuating device (3) is movable on the base plate (1) transversely to the slider element movement direction by said thickened portion (18) of said cassette when said slider element (2) with said cassette is moved into the storage position, wherein said control elements include a control edge (4) and a control wedge (5), said control edge (4) on the actuating device (3) is arranged on said lower-lying portion (15) of the slider element (2) and projects through an opening (14) provided in the slider element (2) and, during insertion of said slider element (2) with said cassette (19) thereon into the storage position, said control edge (4) comes into contact with the slider element (2) to cause transverse movement of the actuating device (3), and the control wedge (5), during said transverse movement of the actuating device (3), comes into contact with the at least one first turning pin (9) protruding from said shaft (11) and, as a result of said contact, rotates and locks the locking members (10) extending from the shaft (11) in the tape reel hubs (17) of the cassette (19).

2. The cassette holder as defined in claim 1, wherein said at least one first turning pin (9) and said control wedge (5) are arranged in a first recess (6) provided in and extending in the baseplate (1) in the slider element movement direction.

3. The cassette holder as defined in claim 1, wherein the slider element (2) has a control element (21) consisting of an edge of the opening (14) which, during movement of the slider element (2) from the storage position to the removal position, engages and moves the actuating device (3) back to a starting position thereof and, as a result, unlocks the locking members (10) from the tape reel hubs (17).

4. The cassette holder as defined in claim 3, wherein the shaft (11) has at least one second turning pin (13) protruding therefrom for engagement with the base plate (1) so that said locking members (10) are returned to a resting position not engaged with the tape reel hubs (17) when said slider element (2) moves from the storage position to the removal position.

5. The cassette holder as defined in claim 4, wherein the at least one second turning pin (13) protrudes into a second recess (12) provided in the base plate (1) in the storage position.

6. The cassette holder as defined in claim 5, wherein, during movement of the slider element (2) from the storage position to the removal position, the at least one second turning pin (13) is rotated to an original position thereof by engagement with an intermediate edge (22) of the second recess (12) provided in the base plate (1) and, as a result, removes the locking members (10) from the tape reel hubs (17).

7. The cassette holder as defined in claim 1, wherein, during movement of the slider element (2), the locking members (10) move in respective additional recesses (20) in the base plate (1), when in a resting position not engaged with the tape reel hubs (17).

* * * * *